United States Patent Office 3,488,355
Patented Jan. 6, 1970

3,488,355
TERTIARY-AMINOALKYL DERIVATIVES OF SUBSTITUTED ACETOHYDROXAMIC ACID ESTERS
Joseph Levy, Paramus, N.J., assignor to Universal Oil Products Company, Des Plaines, Ill., a corporation of Delaware
No Drawing. Filed Sept. 12, 1966, Ser. No. 578,448
Int. Cl. C07d 29/26; C07c 119/00; A61k 27/00
U.S. Cl. 260—294          6 Claims

ABSTRACT OF THE DISCLOSURE

Tertiary-aminoalkyl derivatives of dicycloalkyl-substituted or arylcycloalkyl-substituted acetohydroxamic acid esters exemplified by the 2-diethylaminoethyl derivatives of methyl dicyclohexylacetohydroxamate and the 2-diethylaminoethyl derivative of alpha-hydroxycyclopentylphenylacetohydroxamate. The compounds are useful as anti-spasmodic and anti-cholinergic agents.

---

This invention relates to novel compositions of matter comprising tertiary-aminoalkyl derivatives of substituted acetohydroxamic acid esters. More particularly, this invention is concerned with tertiary-aminoalkyl derivatives of dicycloalkyl or arylcycloalkyl acetohydroxamic acid esters or substitution products thereof, the acid and quaternary salts thereof, and to methods of preparation of said compounds.

It has now been discovered that novel compositions of matter such as tertiary-aminoalkyl derivatives of substituted acetohydroxamic acid esters, the substituents being dicycloalkyl or arylcycloalkyl in nature and the ester portion of the compound being a lower alkyl group, may be prepared in a manner hereinafter set forth in greater detail, said compounds finding a particular use in the medical field, particularly as anti-spasmodic and anti-cholinergic drugs.

It is therefore an object of this invention to prepare tertiary-amino lower alkyl derivatives of substituted acetohydroxamic acid esters which may be utilized as therapeutic agents.

A further object of this invention is to prepare tertiary-amino lower alkyl derivatives of dicycloalkyl and arylcycloalkylacetohydroxamic acid lower alkyl esters.

In one aspect, an embodiment of this invention is found in a compound of the class consisting of a free base, its addition salts with non-toxic acids and lower alkyl quaternary salts, said free base having a formula selected from the group consisting of:

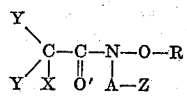

and

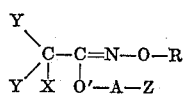

in which Y is selected from the group consisting of aryl and cycloalkyl, at least one Y being cycloalkyl, X is selected from the group consisting of hydrogen and hydroxyl, R is lower alkyl of from 1 to about 5 carbon atoms, A is alkylene of from 2 to about 5 carbon atoms, and Z is selected from the group consisting of di-(lower alkyl)amino, piperidino, pyrrolidino, morpholino, piperidyl, and pyrrolidyl.

A specific embodiment of this invention is found in a compound selected from the group consisting of:

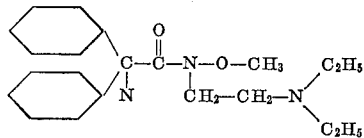

and

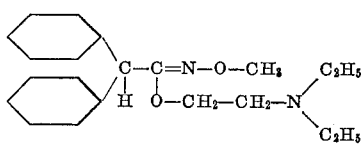

Other objects and embodiments referring to alternative tertiary-aminoalkyl halides, dicycloalkyl or arylcycloalkyl substituted acetohydroxamic acid esters or substitution products thereof will be found in the following further detailed description of this invention.

As hereinbefore set forth, the present invention is concerned with novel compositions of matter comprising tertiary-aminoalkyl derivatives of substituted acetohydroxamic acid esters in which the substituents comprise either dicycloalkyl or arylcycloalkyl, said compounds being prepared by reacting an alkyl ester of a substituted acetohydroxamic acid with tertiary-aminoalkyl halide in the presence of an alkaline agent. In order to define the scope of the invention, the desired products may be represented as follows:

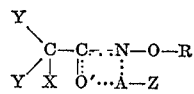

in which Y is selected from the group consisting of aryl and cycloalkyl radicals, at least one Y being a cycloalkyl radical, X is selected from the group consisting of hydrogen and hydroxyl radicals, R is selected from the group consisting of lower alkyl radicals containing from 1 to about 5 carbon atoms, A is selected from the group consisting of straight and branched chain alkylene groups containing from 2 to about 5 carbon atoms and Z is a basic nitrogen-containing radical selected from the group consisting of di-(lower alkyl)amino, the alkyl portion of the di-(lower alkyl)amino radicals containing from 1 to about 5 carbon atoms, and cyclic amino groups selected from the group consisting of piperidino, pyrrolidino, morpholino, piperidyl and pyrrolidyl radicals. The dotted lines utilized in the above representation indicate that the alkylene group A may be attached either to the nitrogen or oxygen atoms with a corresponding shift in the double bond, thereby forming isomeric products. Thus, when A is attached to nitrogen, the compound may be more specifically represented by the following formula:

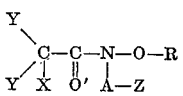

and when A is attached to oxygen by the formula:

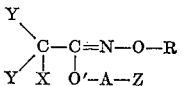

These compounds comprising novel compositions of matter may be conveniently prepared by reacting a lower alkyl ester of a substituted acetohydroxamic acid having the generic formula:

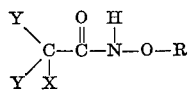

in which the Y, R and X radicals having the same meaning as hereinbefore set forth with a tertiary-aminoalkyl halide have the generic formula:

Hal—A—Z in which the A and Z radicals having the same meaning as hereinbefore set forth and Hal is a halogen having an atomic weight of from 35 to 80 (i.e., chlorine or bromine), preferably chlorine inasmuch as the chlorine-containing compounds are more readily available at a lower cost, in the presence of an alkaline substance.

Examples of lower alkyl esters of substituted acetohydroxamic acids which may be used in the process of this invention include methyl dicyclopentylacetohydroxamate,
methyl dicyclohexylacetohydroxamate,
methyl cyclopentylphenylacetohydroxamate,
methyl cyclohexylphenylacetohydroxamate,
methyl-cyclohexyl-p-chlorophenylacetohydroxamate,
ethyl dicyclohexylacetohydroxamate,
ethyl cyclopentylphenylacetohydroxamate,
ethyl cyclohexyl-p-methoxyphenylacetohydroxamate,
ethyl cyclopentyl-p-tolylacetohydroxamate,
propyl dicyclohexylacetohydroxamate,
methyl α-hydroxydicyclohexylacetohydroxamate,
methyl α-hydroxycyclopentylacetohydroxamate,
methyl α-hydroxycyclohexylphenylacetohydroxamate,
ethyl α-hydroxydicyclohexylacetohydroxamate, etc.

Examples of tertiary-aminoalkyl halides in which the nitrogen may be di-(lower alkyl substituted) or which may form a part of the heterocyclic ring and which fall within the generic formula hereinbefore set forth include 2-chloro-N,N-dimethylethylamine,
2-bromo-N,N-dimethylethylamine,
2-chloro-N,N-diethylethylamine,
3-chloro-N,N-dimethylpropylamine,
3-chloro-N,N-diethylpropylamine,
2-chloro-N,N-diethylisopropylamine,
2-chloro-1-(N-methylpiperidyl-2)ethane,
2-chlor-1-piperidinoethane,
2-chlor-1-pyrrolidinoethane, etc.

It is to be understood that the aforementioned lower alkyl esters of substituted acetohydroxamic acids and tertiary-aminoalkyl halides are only representative of the class of compounds which may be used and that the present process is not necessarily limited thereto.

One method of preparing the tertiary-aminoalkyl derivatives of the substituted acetohydroxamic acid ester according to the process of this invention involves the reaction of an alkali metal salt of a lower alkyl ester of a substituted acetohydroxamic acid of the type hereinbefore set forth with a tertiary-aminoalkyl halide also of the type hereinbefore set forth. The alkali metal salts are preferably produced by reacting the hydroxamic acid ester with an alkali metal, metal hydride, or amide such as sodium metal, lithium metal, potassium metal, sodium hydride, potassium hydride, lithium hydride, sodamide, potassium amide, lithium amide, etc. The reaction may be effected in the presence of an inert organic solvent such as an aromatic hydrocarbon; i.e., benzene, toluene, xylene, etc.; a paraffinic hydrocarbon such as pentane, hexane, heptane, cyclohexane, etc. Other inert solvents such as dimethyl formamide, dimethyl acetamide, dimethoxy ethane, dimethyl sulfoxide, etc. may be used to advantage. It is also feasible under appropriate conditions to prepare the alkali metal salts of the hydroxamate esters by employing alkali metal hydroxides such as sodium hydroxide, potassium hydroxide, lithium hydroxide.

A preferred method of preparing the products of the present invention comprises gradually adding the lower alkyl ester of the substituted acetohydroxamic acid to the alkali metal compound, such as for example, sodium hydride, which has been suspended in the particular organic solvent and after the evolution of hydrogen has ceased the tertiary amino halide is added. The mixture is then heated to the desired temperature. The reaction may proceed at room temperature, although elevated temperatures up to the reflux temperature of the particular solvent employed may be used to increase the reaction rate and thus complete the reaction. Upon completion of the desired reaction, the alkali metal halide resulting from the reaction is filtered off and the solvent is evaporated or removed by distillation in vacuum following which the product may then be isolated by conventional means taking advantage of the relative acidic and basic properties of the materials present to achieve separation and purification. The product may be converted to a crystalline salt for example by utilizing mineral or organic acids such as hydrochloric acid, sulfuric acid, tartaric acid, citric acid, maleic acid, fumaric acid, oxalic acid, etc. The quaternary salts are also readily produced by reacting the free base with an alkyl halide, an alkyl sulfate, toluene sulfonate, etc., in a suitable solvent according to well-known procedures following which the crystalline product is separated and purified by recrystallization from a suitable solvent.

As hereinbefore described, the reaction products which are obtained according to the process of this invention comprise novel compositions of matter and will comprise N-tertiary-aminoalkyl-O-alkyl dicycloalkyl or arylcycloalkyl substituted acetohydroxamate compounds if the aforesaid tertiary aminoalkyl group is attached to the nitrogen atom; or O'-tertiary-aminoalkyl-O-alkyl dicycloalkyl or arylcycloalkyl substituted acetohydroxamate compounds if the tertiary-aminoalkyl group is attached to the oxygen atom as shown in the hereinbefore set forth generic formulae.

A possible alternative method of synthesizing compounds of the present invention comprises reacting a dicycloalkyl or arylcycloalkyl substituted acetic acid halide possessing the generic formula:

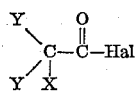

in which Y, X and Hal has the same meaning as above, except that when X is hydroxy it is protected by, for example, an acetyl group which can be removed subsequently by hydrolysis, with a tertiary-aminoalkylalkoxyamine having the generic formula:

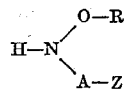

in which A and Z have meanings similar to that hereinbefore set forth according to the following equation:

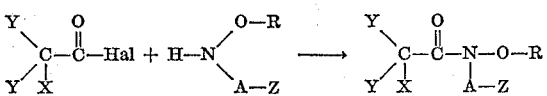

It is to be understood from the above equation that when this method of synthesis is used, only the N-tertiary-aminoalkyl-O-alkyl substituted acetohydroxamate compounds are formed.

Examples of tertiary-aminoalkyl derivatives, the term "derivatives" as utilized in the present specification denoting the two isomeric products of the reaction as hereinbefore described, of lower alkyl esters of dicycloalkyl and arylcycloalkyl substituted acetohydroxamic acids which are prepared according to the process of this invention include the 2-dimethylaminoethyl derivatives of methyl dicyclopentylacetohydroxamate, the 2-diethylaminoethyl derivatives of methyl dicyclohexylacetohydroxamate, the 2-diethylaminoethyl derivatives of methyl cyclopentylphenylacetohydroxamate, the 2-diethylaminoethyl derivatives of methyl cyclohexylphenyl acetohydroxamate, the methobromide quaternary salts of the 2-diethylaminoethyl derivatives of methyl dicyclohexylacetohydroxamate, the 2-diethylaminoethyl derivatives of ethyl dicyclohexylacetohydroxamate, the 2-diethylaminoethyl derivatives of propyl dicyclohexylacetohydroxamate, the 2-diethylaminoethyl derivatives of methyl α-hydroxydicyclohexylacetohydroxamate, the 2-diethylamino ethyl derivatives of methyl α-hydroxycyclopentylphenylacetohydroxamate, the 3-dimethylaminopropyl derivatives of methyl dicyclohexylacetohydroxamate, the 2-piperidinoethyl derivatives of methyl cyclopentylphenylacetohydroxamate, the 2-pyrrolidinoethyl derivatives of methyl cyclopentylphenylacetohydroxamate, the 2-(N-methylpiperidyl-2)ethyl derivatives of methyl dicyclohexylacetohydroxamate, etc. As is evident from the above list of compounds, the term "tertiaryaminoalkyl derivatives of lower alkyl esters of dicycloalkyl and cycloalkylaryl substituted acetohydroxamate acid esters" as used in the present specification will also refer to the acid addition salts and quaternary salts of these compounds. It is to be understood that the aforementioned compounds are only representative of the class of compounds which may be prepared and that the process of this invention is not necessarily limited thereto.

The following examples are given to illustrate the process of the present invention which, however, are not intended to limit the generally broad scope of the present invention in strict accordance therewith.

EXAMPLE I

A solution of methyl dicyclohexylacetohydroxamate in dimethyl formamide is slowly added to a suspension of an equimolar amount of sodium hydride in dimethyl formamide while maintaining the temperature of the flask in a range of from about 25° to about 30° C. A vigorous reaction proceeds with the evolution of hydrogen gas. Following this, an equimolar quantity of 2-chloro-N,N-diethylethylamine is slowly added while maintaining the temperature of the reaction mixture at about 50° C. Upon completion of the addition of the aminoalkyl halide, the reaction mixture is then gradually heated to a temperature of about 100° C. and maintained for an additional period to complete the reaction. The flask and contents thereof are then allowed to cool to room temperature, following which the sodium chloride which form during the reaction is filtered off and the solvent is evaporated. The residual oil is taken up in a water immiscible solvent and the solution is extracted with dilute aqueous sodium hydroxide solution whereby any unreacted methyl dicyclohexylacetohydroxamate starting material is removed and discarded. The solution is then washed with water and the solvent is evaporated to yield the crude reaction product. Purification may be accomplished by crystallization from a suitable solvent to recover the desired 2-diethylamino derivative of methyl dicyclohexylacetohydroxamate. Alternatively, the free base may be converted to an acid salt by conventional means and the latter purified by crystallization. In addition, if so desired, the methobromide quaternary salt may also be prepared by reacting the free base with methylbromide.

EXAMPLE II

The general procedure of Example I is repeated except that an equimolar amount of methyl α-hydroxydicyclohexylacetohydroxamate is employed instead of methyl dicyclohexylacetohydroxamate to produce the desired 2-diethylaminoethyl derivative. The free base may be treated in a manner similar to that set forth above to form acid salts or quaternary salts.

EXAMPLE III

The general procedure of Example I is repeated except that an equimolar amount of 3-chloro-N,N-dimethylpropylamine is substituted for 2-chloro-N,N-diethylethylamine to produce the desired 3-dimethylaminopropyl derivative of methyl dicyclohexylacetohydroxamate.

EXAMPLE IV

The general procedure of Example I is repeated except that an equimolar amount of 2-chloro-1-(N-methylpiperidyl-2-)ethane is substituted for 2-chloro-N,N-diethylethylamine to produce the desired 2-(N-methylpiperidyl-2)-ethyl derivative of methyl dicyclohexylacetohydroxamate.

EXAMPLE V

The general procedure of Example I is repeated except that an equimolar amount of methyl α-hydroxycyclopentylphenylacetohydroxamate is substituted for methyl dicyclohexylphenylacetohydroxamate to produce the desired 2-diethylaminoethyl derivative.

I claim as my invention:

1. A compound of the class consisting of a free base, its addition salts with non-toxic acids and lower alkyl quaternary salts, said free base having a formula selected from the group consisting of:

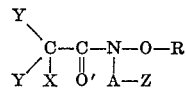

and

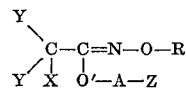

in which Y is selected from the group consisting of phenyl, lower alkyl phenyl, lower alkoxy phenyl, chlorophenyl and $C_5$ or $C_6$ cycloalkyl, at least one Y being cycloalkyl, X is selected from the group consisting of hydrogen and hydroxyl, R is lower alkyl of from 1 to 5 carbon atoms, A is alkylene of from 2 to about 5 carbon atoms, and Z is selected from the group consisting of di-(lower alkyl) amino, piperidino, pyrroldino, morpholino, and N-methyl piperidyl radicals.

2. A compound according to claim 1, being selected from the group consisting of:

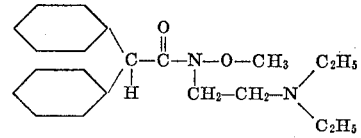

and

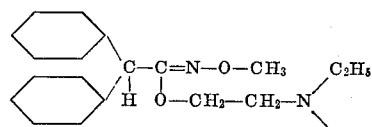

3. The compound of claim 1, being selected from the group consisting of:

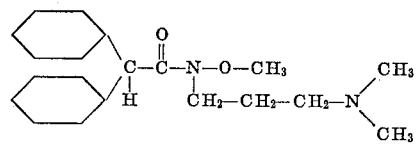

and

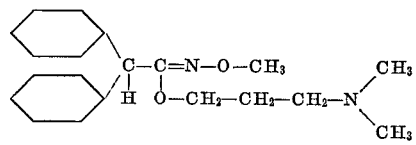

4. The compound of claim 1, being selected from the group consisting of:
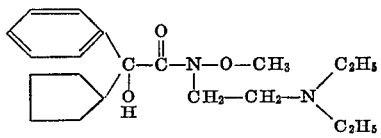
and
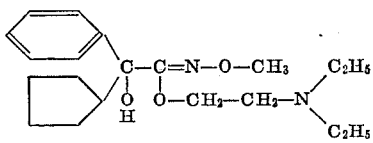
5. The compound of claim 1, being selected from the group consisting of:
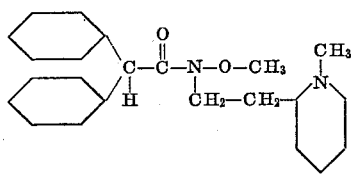
and
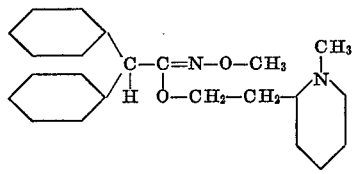
6. The compound of claim 1, being selected from the group consisting of:
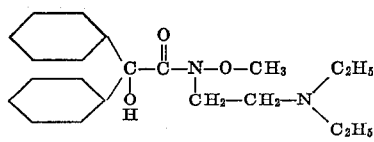
and
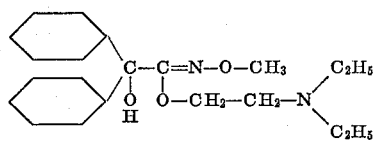
References Cited
UNITED STATES PATENTS
| | | | |
|---|---|---|---|
| 3,183,255 | 5/1965 | Levy | 260—453 |
| 3,268,539 | 8/1966 | Levy | 260—294 |
| 3,230,227 | 1/1966 | Levy | 260—294 |
HENRY R. JILES, Primary Examiner
G. THOMAS TODD, Assistant Examiner
U.S. Cl. X.R.
260—247.2, 247.7, 294.7, 326.3, 326.5, 453, 566, 999